United States Patent [19]
Johnson

[11] 4,229,133
[45] Oct. 21, 1980

[54] LUMBER SPACER AND STICK LAYER

[76] Inventor: Charles L. Johnson, 1000 Virgie St., Durham, N.C. 27705

[21] Appl. No.: 944,073

[22] Filed: Sep. 20, 1978

[51] Int. Cl.³ .......................................... B65G 57/26
[52] U.S. Cl. ........................................ 414/42; 193/1; 198/459; 414/60
[58] Field of Search .................... 414/42, 60, 786; 198/459, 460; 193/1, 2 R

[56] References Cited

U.S. PATENT DOCUMENTS

| | | | |
|---|---|---|---|
| 1,796,575 | 3/1931 | Morgan | 414/42 |
| 2,915,202 | 12/1959 | Aitken | 414/60 |
| 3,081,888 | 3/1963 | Lawson | 414/42 X |
| 3,236,162 | 2/1966 | Reist | 198/425 X |
| 3,343,689 | 9/1967 | Fehely | 414/42 |
| 3,643,621 | 2/1972 | Newnes | 414/42 X |
| 3,738,510 | 6/1973 | Mason | 414/42 X |

FOREIGN PATENT DOCUMENTS

| | | | |
|---|---|---|---|
| 2045614 | 11/1971 | Fed. Rep. of Germany | 414/42 |
| 87646 | 10/1936 | Sweden | 414/42 |
| 226034 | 4/1969 | Sweden | 414/42 |

*Primary Examiner*—L. J. Paperner
*Attorney, Agent, or Firm*—Mills & Coats

[57] ABSTRACT

In abstract, a preferred embodiment of the present invention is a lumber spacer which automatically separates lumber in parallel alignment, drops spacer sticks on top of the stacked lumber, and then stacks further lumber thereon. The stick layer portion of the present invention is of such design that warped, bent or other normally unsuitable sticks can be used without affecting the laying operation or the subsequent stacking operation.

7 Claims, 10 Drawing Figures

LUMBER SPACER AND STICK LAYER

FIELD OF INVENTION

This invention relates to wood processing equipment and more particularly to lumber stacking and stick laying devices.

BACKGROUND OF THE INVENTION

Since man first began to transform timber into lumber, it became obvious that the lumber needed to be dried prior to being used. In earlier times, quite often cut lumber would simply be stacked in tee-pee fashion about the trunk of a convenient tree. With the advent of saw mills, the amount of lumber that could be cut at one location substantially increased and stacking the lumber in rows and layers became a common practice. This accomplished two things, first, stacked lumber requires much less space for storage and secondly, it generally reduces warpage due to drying. This stacking process at saw mills and lumber yards was a laborious task generally requiring at least two men with at least some skill in order to arrange the stacks in such a manner that air could circulate therethrough to expedite drying and to reduce the possibility of rot which would quickly occur in a tightly packed stack of green or wet lumber.

In more recent years, various devices and apparatus have been developed to aid in the stacking and handling of lumber. These have included sorting devices and conveyors as well as apparatus for stacking the lumber. Some of these last mentioned machines have had incorporated thereinto means for inserting spacer sticks between the layers of lumber. These stick inserters or layers have almost invariably been integrally incorporated into the lumber stacking device with which they are associated and are integrally connected thereto and dependent thereon to the point they are unusable except with the machine they are specifically designed for use in conjunction with.

The majority of the lumber stackers in use today, however, do not have built-in stick layers or inserters but simply rely on manual labor to place the sticks between the layers before the next layer is stacked. This manual stick laying is inaccurate and random at best, requires labor with relatively good coordination and dexterity, and is generally the one bottle necks in operation that controls the amount of lumber which can be stacked in any given time period.

In the integral lumber stacking and stick inserting devices mentioned above, the one requirement for proper operation is that the sticks contained within the hopper be for all practical purposes straight with no warps, twists or bows therein. Whenever a stick is more than a few millimeters out of true, the same will jam the logging mechanism causing the entire machine to be shut down until the warped stick can be removed and discarded. Since most integral stick feeds are gravity fed from a hopper, the offending stick is invariably at the bottom of the pile which makes it not only difficult and time consuming to remove but can on occasion be dangerous to the person removing the same. When using hand layed sticks, the warp problem is not as critical; however, proper locational alignment on the stack is approximate at best and uniformity is for all practical purposes impossible.

SUMMARY OF INVENTION

After much research and study into the above-mentioned problems, the present invention has been developed to provide a universal stick laying device which can be used in conjunction with most conventional lumber stackers, which will accurately place the sticks between the layers at the desired aligned location, and will operate with warped, twisted or otherwise deformed sticks which would ordinarily be unusable with the integral stick laying devices found on prior art lumber stackers. The present invention in other words has the accuracy and pattern of an automatic stick laying machine and yet can utilize sticks which heretofore could only be used when manually laying sticks between lumber layers.

In combination with the improved stick layer, a lumber spacer is provided which will automatically and accurately space the lumber being stacked so that uniform air drying of the same can be accomplished. Each of these portions of the present invention have their own advantages and when used together provide an unique combination of features for lumber handling.

In view of the above, it is an object of the present invention to provide an improved stick layer which is accurate in alignment and yet operative with warped, bent or otherwise deformed sticks.

Another object of the present invention is to provide a combination lumber spacer and stick layer which gives a stack pattern which allows maximum air circulation through the same for optimum drying.

Another object of the present invention is to provide an improved stick layer which can be used in conjunction with many different types of lumber stackers.

Another object of the present invention is to provide a simple and yet highly efficient spacing means for use in conjunction with a lumber stacker.

Another object of the present invention is to provide a combination lumber spacer and stick layer which is relatively inexpensive to manufacture, is simple and efficient in operation, and requires a minimum of down time for adjustments and repairs.

Another object of the present invention is to provide a lumber spacer which can be used in conjunction with a plurality of different length lumber.

Another object of the present invention is to provide a combination lumber stacker and stick layer which can be operated by a single employee of minimum skill.

Another object of the present invention is to provide a hopperless stick layer which alternately drops sticks from alternate sides of the device.

Other objects and advantages of the present invention will become apparent and obvious from a study of the following description and the accompanying drawings which are merely illustrative of such invention.

DETAILED DESCRIPTION OF PREFERRED EMBODIMENT

Figure 1:
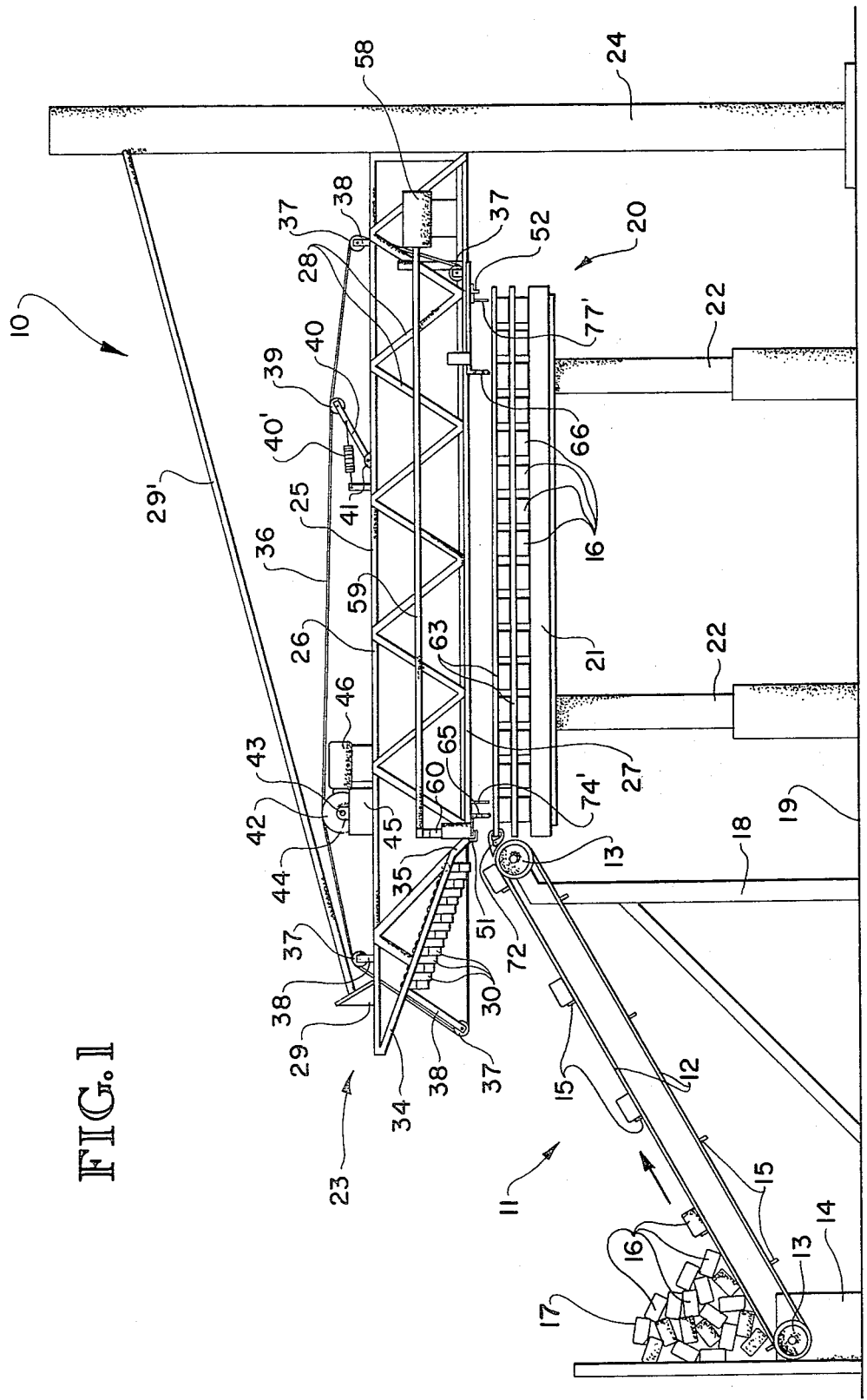
FIG. 1 is a side elevational view of the lumber spacer and stick layer of the present invention.
Figure 2:
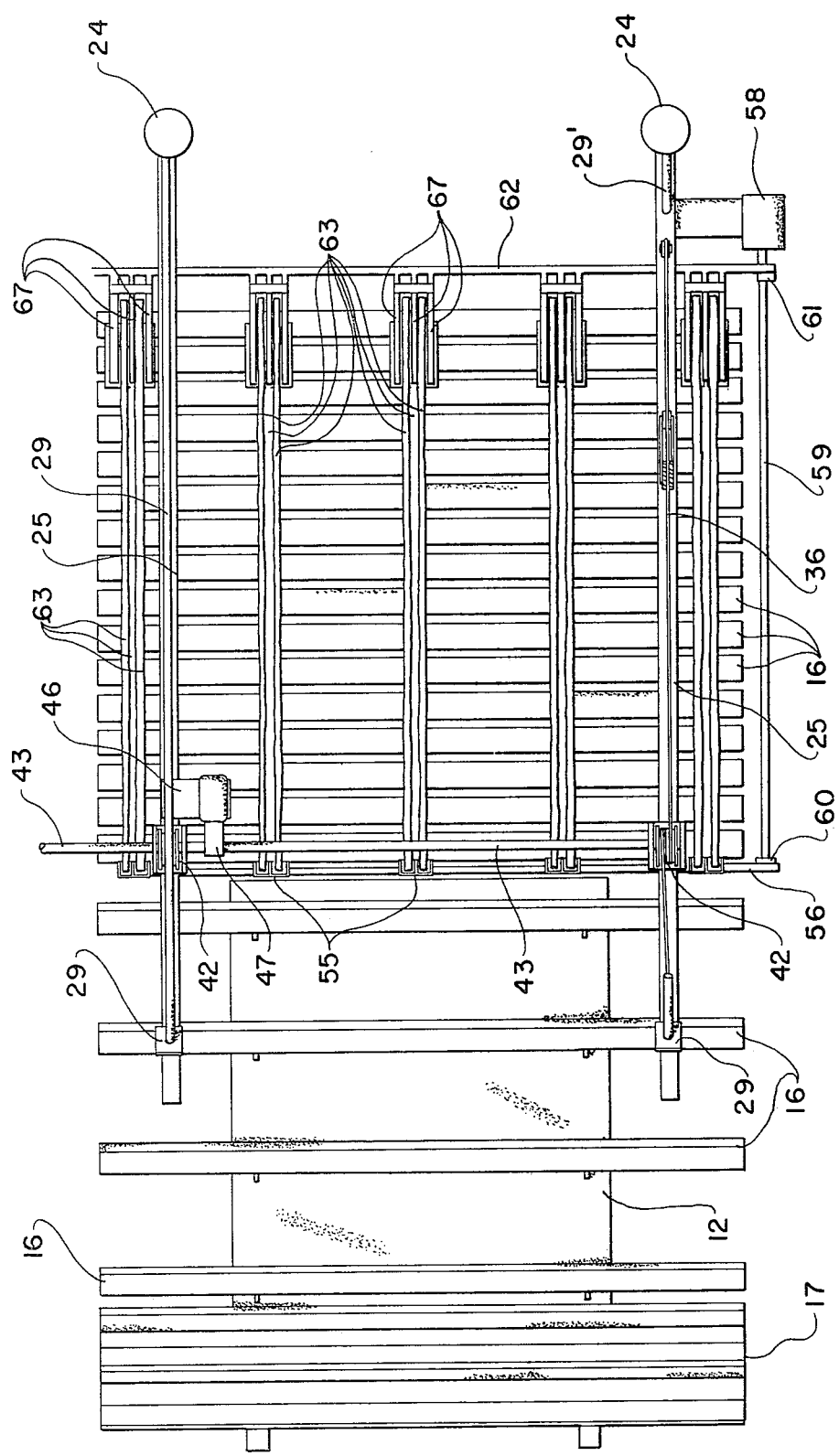
FIG. 2 is a top plan view of such invention.

With further reference to the drawings, the combination lumber stacker, spacer and stick layer, indicated generally at 10, includes a lumber feed means indicated generally at 11. This feed means can be in the form of a lumber unscrambler such as that shown schematically, a simple lumber conveyor, or any one of the number of commercially available lumber sorters and unscramblers with output feeds similar to the feed means indicated at 11.

If feed means 11 is of the unscrambler type (and it need not necessarily be), a belt or chain conveyor 12 is trainingly mounted over roller or pulley means 13. A standard drive means (not shown) mounted within housing 14 operatively moves belt 12 in the direction indicated by the arrow in FIG. 1. Lugs 15 are provided for picking up and moving the lumber 16 in orderly, spaced fashion from the randomly disposed lumber pile 17. A relatively fixed support member 18 is provided at the upper end of belt 12 and rotatively mounts upper roller or pulley 13. The other end of support 18 is fixedly secured to surface or foundation 19.

The stack support portion of the present invention, indicated generally at 20, includes a lumber stack support platform or pallet 21.

A plurality of extensibly and retractable support means are provided which are secured at one end to platform 21 and at the other end to support surface or foundation 19. These support means 22 can be either hydraulically, pneumatically or mechanically motivated and operate up and down in the manner hereinafter described in greater detail.

The final major portion of the combination lumber stacker, spacer and stick layer of the present invention is the lumber spacer and stick layer portion indicated generally at 23. Although these units are described as being mounted on the same frame and indicated as the same portion of the overall device disclosed, it is to be specifically understood that the stick layer can be used without the lumber spacer and conversely the spacer could be used without the stick layer. Even though in most applications, the spacer and stick layer would be used together, there are many lumber stackers in existence which can use the stick layer portion of the present invention without the stacker or spacer portions. Thus, the stick laying portion of the present invention is of such importance individually that the same does not have to be limited to its combination with the other portions of the disclosure even though it works very well with the same.

A plurality of stanchions 24 are provided to support the spacer and layer portion 23. These stanchions at their lower ends are firmly attached to surface or foundation 19 and intermediately their ends fixedly support one end of each of the outwardly projecting truss members 25.

Each of these trusses are formed from a relatively heavy upper channel member 26, a pair of facing angular members 27 to form a spacer track, and cross braces 28.

On the outer end of each of the trusses 25 opposite their respective stanchions 24 is a tie connector 29. A tie rod or cable 29' is secured between connector 29 and the upper portion of stanchion 24 to rigidly support and brace the truss members relative to stanchion.

Figure 8:
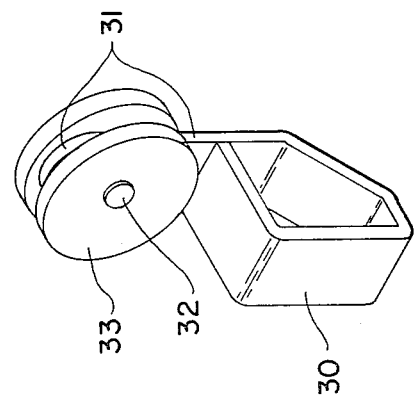
FIG. 8 is an enlarged perspective view of a typical spacer block.

A plurality of lumber spacer blocks 30 are provided and include an upwardly projecting flange portion 31 whose upper end is adapted to accommodate shaft 32 as can clearly be seen in FIG. 8. Wheels or rollers 33 are rotatively mounted on shaft 32 and are adapted to freely roll within the spaced track formed by facing angle members 27. The end of track 27 opposite stanchion 24 is inclined as can be seen at 34 in FIG. 1. A slightly greater downward slope 35 connects incline portion 34 to the horizontal portion of track 27 and assures that the spacer blocks will move quickly and positively when dropped between pieces of lumber as will hereinafter be set forth in more detail.

A plurality of endless cables 36 are provided which are trained around fixed pulleys 37 which are mounted on trusses 25 by stand-off arm 38. A tension pulley 39 is provided for each cable and is mounted on a swing arm 40 which is pivotably attached to truss 25 at pivot mounting 41. A biasing means such as spring 40' is provided for biasing swing arm 40 to maintain tension on cable 36.

In addition to being trained around pulleys 37 and 39, each of the cables 36 are wrapped several times around a drive drum 42. These drive drums are fixedly secured to rotatable shaft 43 which in turn is rotatively mounted on each of the trusses 25 by means such as bearing blocks 44 and mounting members 45.

A shaft drive motor 46 is provided which is operatively connected to shaft 43 by drive connection 47. The operation of drive motor 46 and drive connection 47 are of any suitable type, are well known to those skilled in the art and further description of the same is not deemed necessary.

A spacer block return stop 48 is fixedly secured to cable 36 and includes at least one roller 49 which is adapted to run in track 27 similar to rollers 33. The details of operation of this portion of the present invention will hereinafter be discussed further.

Connecting trusses 25 are cross members 51 and 52. These cross members are preferably fixedly secured by weldment or the like to angle members 27 of each of the trusses.

Figure 3:
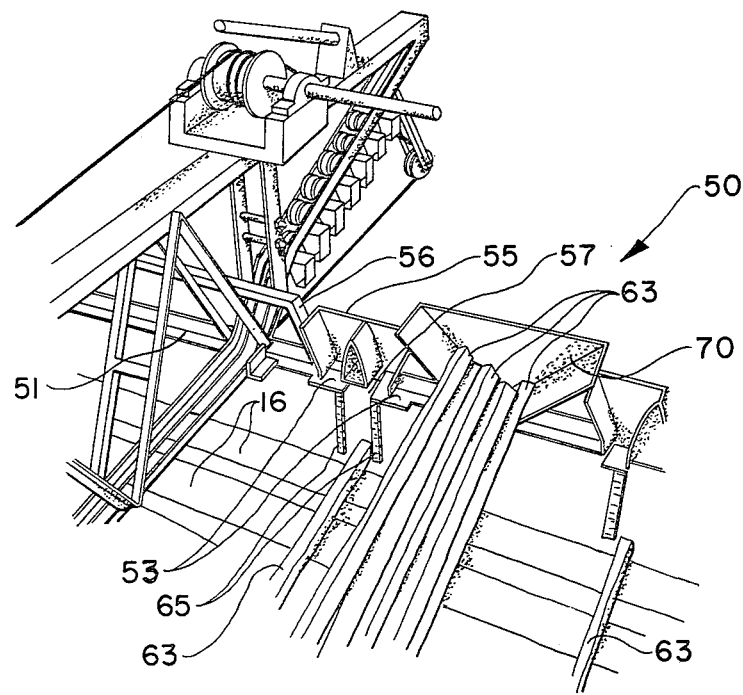
FIG. 3 is a perspective view of one end of the stick layer portion of the present invention.
Figure 4:
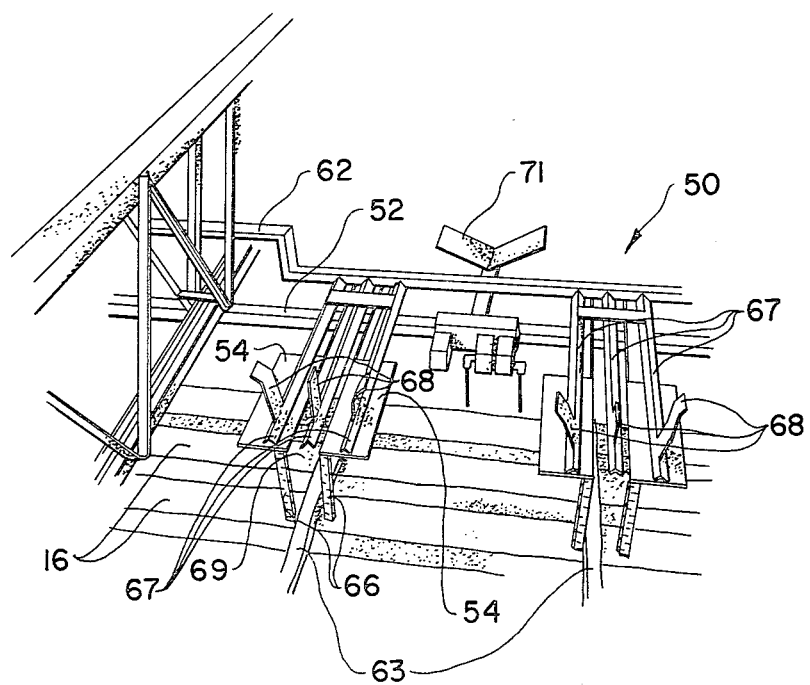
FIG. 4 is a perspective view of the opposite end of the stick layer portion shown in FIG. 3.

The semi-automatic stick layer portion of the present invention, indicated generally at 50, includes first end pairs of stick support plates 53 and second end pairs of stick support plates 54 fixedly secured, respectively, to cross members 51 and 52 as can clearly be seen in FIGS. 3 and 4.

Relative to the first end shown in FIG. 3, a cut-off W-shaped in cross section stick receiving pocket 55 is provided. The inner side walls 56 of pocket 55 are inwardly tapered toward the bottom thereof which, when in the position shown in FIG. 3, is formed by support plates 53. A stick layer shift rod 56 is provided so that pockets 55 can be shifted laterally relative to plates 53. To move the shift rod 56 a distance equal to the opening 57 between plates 53 in either direction from the rest position shown in FIG. 3, a small increment, reversible motor 58 is provided. Since motors of this type are well known to those skilled in the art, further discussion of the same is not deemed necessary.

Extending outwardly from motor 58 is an elongated shaft 59. Fixedly secured to shaft 59 adjacent each end thereof are shift rod arms 60 and 61. Each of these last mentioned arms are pivotably secured to their respective shift rods 56 and 62 so that as motor 58 partially rotates, shaft 59 with arms 60 and 61 fixedly secured thereto will cause the outer end of such arms to move in one direction or the other thus longitudinally moving shift rods 56 and 62 in unison.

Since stick support plates 53 are approximately twice as wide as opening 57, when pockets 55 move in one direction, a stick lying in one of the sides thereof will move over opening 57 and fall therethrough and when such pocket is shifted in the opposite direction an equal distance, the stick on the other side of the pocket will fall through opening 57.

To prevent the sticks 53 from rolling or otherwise going askew as it passes through opening 57 onto the lumber 16 stacked therebelow, motorcycle or bicycle type drive chains 65 are suspended below each of the plates 53 as can clearly be seen in FIG. 3. Since chains of this type (when hung as illustrated) can readily move in the longitudinal direction of the disposition of such sticks, and yet because of their structure cannot move laterally relative thereto, these chains form a good guide relative to lateral movement of the stick and yet can readily be pushed out of the way as lumber 16 passes thereunder during the stacking process as will hereinafter be described.

Chains 66 are provided below support plates 54 as shown in FIG. 4 and are constructed and have the same movement characteristics as above described for chains 65.

Triple sets of outwardly extending fingers 67 are fixedly secured to shift rod 62 as can clearly be seen in FIG. 4. Guide flanges 68 are provided for each of the fingers 67 with the outer two of each set being outwardly flared and the center one being uprightly disposed. The operation of fingers 67 and their associated flanges 68 relative to stick support plates 54 are the same as pockets 55 relative to stick support plates 53. Slot like openings 69 are, of course, utilized in the same manner as hereinabove described for opening 57.

Since shift rods 56 and 62 move in unison, when shaft 59 is partially rotated, one end of a stick drops from pocket 55 through opening 57 and the other end of such stick drops simultaneously from between the outwardly extending fingers 57 through opening 69.

Because the machine down time due to jammed sticks in hopper fed stick laying machines amounts to considerably more dollar cost than the salary of a minimum skilled laborer, the stick layer of the present invention is semi-automatic in operation with the sticks being placed in pockets 55 and between fingers 67 manually.

To empty any given pocket and its aligned fingers with one stick on each side thereof means that two layers of lumber can be made up before refilling. Thus even relatively unskilled labor can take the sticks 53 from the V-shaped stick racks or holders 70 and 71 and reload one side of the pocket-finger combination while the other side is being dropped. Each of the stick racks 70 and 71 are, of course, fixedly secured to cross members 51 and 52, respectively.

Because the sticks of the stick layer portion 50 of the present invention are supported and dropped from their ends only, warped, bent, twisted or otherwise deformed sticks can be used without danger of jamming or malfunction in the layer process.

A stick gripper 72 of any convenient design is provided for the end of each dropped stick adjacent the stack on load end so that as the lumber slides over the sticks, they will be held in proper position until that layer of lumber is made up. Since gripping devices of this type are well within the ability of those skilled in the art, further detailed description of the structure and operation of the same is not deemed necessary.

Figure 6:
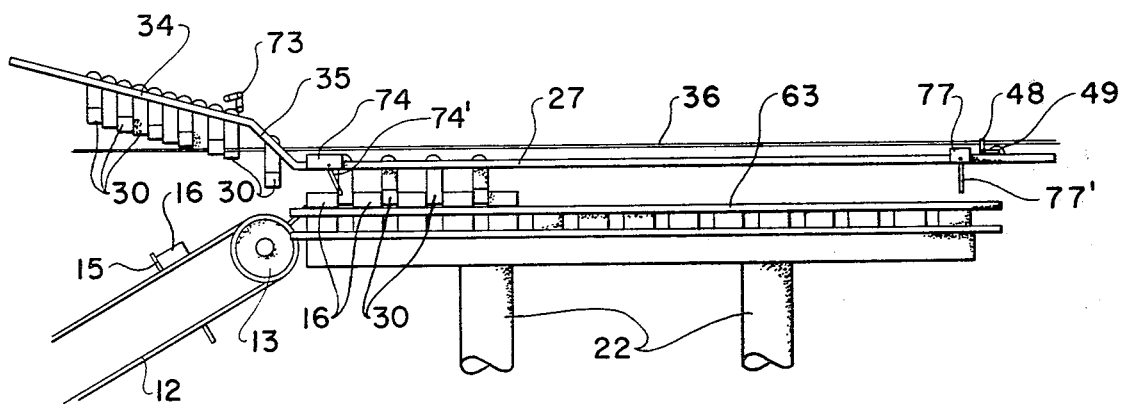
FIG. 6 is a side elevational view showing schematically the spacing of the layer of lumber.
Figure 7:
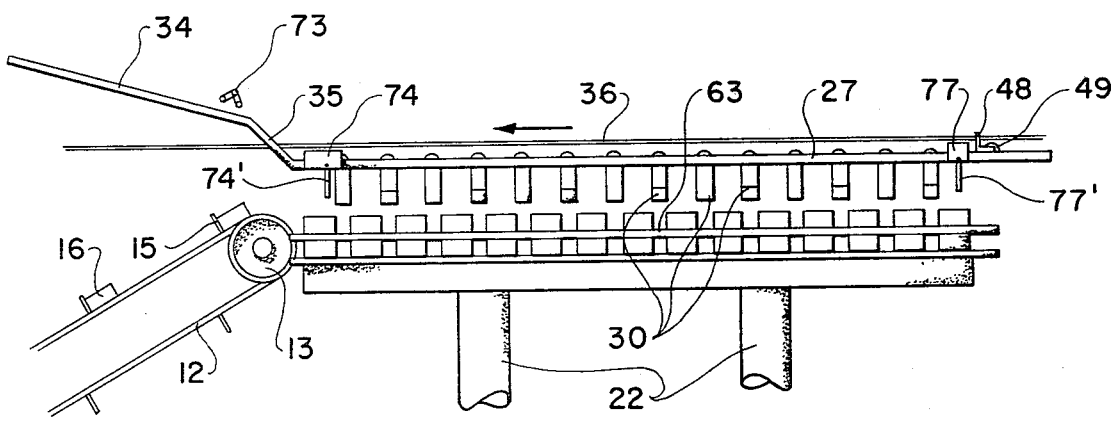
FIG. 7 is a side elevational view showing schematically the completed layer of lumber with the spacer blocks poised for retraction.
Figure 9A:
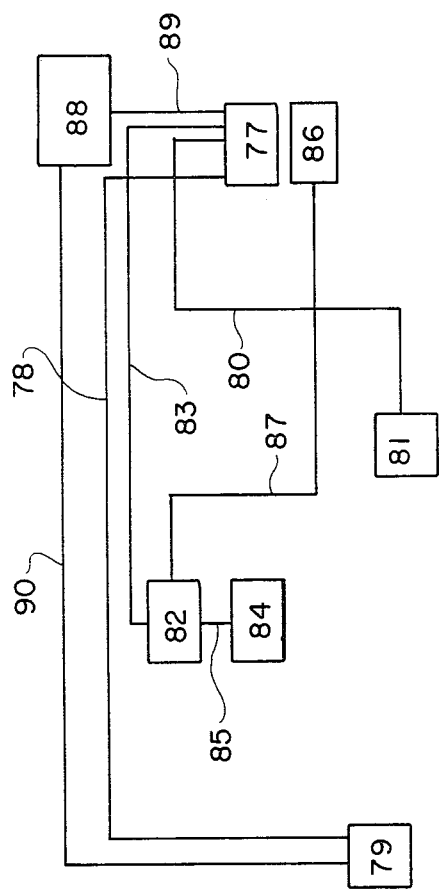
FIG. 9A is a block diagram of the control circuit for the present invention.
Figure 9B:
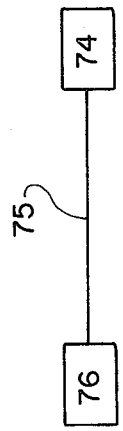
FIG. 9B is a block diagram of the spacer drop circuit.

Describing more fully the operational sequence of the lumber spacer, stacker and stick layer of the present invention, the lumber support platform 21 is raised to a point adjacent the discharge end of feed belt 12 of feed means 11 and the same is in the direction of the arrow shown in FIG. 1. As the lumber 64 is fed onto the platform (or onto the sticks in subsequent layers of the stack) lumber spacer operating microswitch 74 is engaged. This switch sends a pulse through a connector 75 to rocker arm control 76. This control moves the rocker arm 77 from its normal spacer block holding position shown in FIG. 7 to the release position shown in FIG. 6. Since the incline 34 increases at 35, the released spacer block 30 will immediately move down track 27 to the point adjacent the solenoid tripping piece of lumber 64 as shown in dotted lines in FIG. 6. The conveyor belt 12 continues to run and as the next piece of lumber is delivered to the stack, switch 74 is again tripped to again activate rocker arm 73 to release another spacer block 30. This sequence is continued on each truss track 27 with each new piece of lumber 64 being delivered from belt 12 to the stack pushing the earlier deposited pieces of lumber with the spacer blocks therebetween in the direction of the arrow shown in FIG. 7.

When the first piece of lumber deposited on the stack layer being made up reaches trip finger 77' of full layer micro unit 77, the following sequential operation will take place.

The full layer signal from switch 77 will, through connector 78, shut down belt 12 through belt drive control 79. Next through connector 80 the stack support control 81 will lower retractable support means 22 and thus platform 21 a distance equal to the thickness of one layer of lumber plus its associated spacer sticks.

Figure 5:
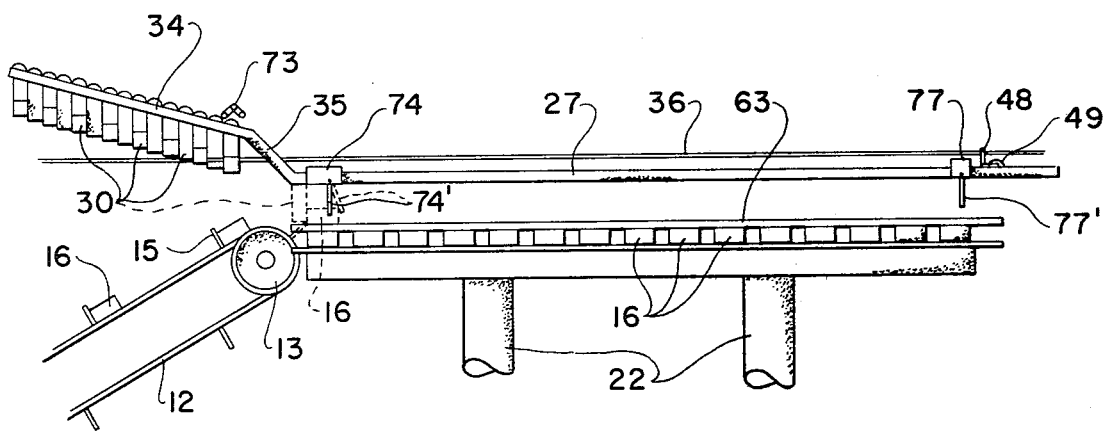
FIG. 5 is a side elevational view showing schematically the lumber spacer portion of the present invention with the spacer blocks retracted position.

Once the platform 21 has been dropped by stack control 81, spacer block retract control 82 will be activated through connector 83 which will activate motor 46 of drive drum 42. Endless cable 36 will then move in the direction of the arrow shown in FIG. 7 which will, of course, carry spacer block return stop 48 along with it. As cable 36 moves, the various spacer blocks 30 will be engaged by stop 48 and they will move back along track 27 to the return position shown in FIG. 5. At the moment this return condition is accomplished, spacer block retract microswitch 84 will be engaged to reverse the direction of travel of motor 46 and thus drum 42 through connector 85 and spacer control 82. Cable 36 will continue to move in the opposite direction from retract until stop 48 reaches the operative position shown in FIGS. 5 through 7. At this point microswitch 86 will be engaged and through connector 87 and spacer retract control 82, will shut down motor 46.

The final sequential step prior to another layer being added to the one previously deposited on platform 21 is for stick drop control 88 to be activated through connector 87 to motivate drop motor 58 which, through interconnected stick layer shift rods 56 and 62, will drop sticks 63. Once control 88 has caused the sticks 63 to drop, a signal is sent through connector 90 to belt drive control 79. This control activates the motor within housing 14 to again move chain or belt 12 in the direction shown by the arrow in FIG. 1.

Layer after layer will be built up as described above until a full stack is completed. Once this is accomplished, the lumber is removed from the support platform or pallet 21 by any suitable means such as a fork lift, roller conveyor or similar means. The platform 21 then is moved back up by supports 22 to operating position and the layering process begins again. The stopping at full stack and removal of the same prior to the repetitive sequence can, of course be done automatically through proper location and connection of appropriate equipment which is considered within the ability of those skilled in the art in view of the teaching of the present disclosure.

From the above, it can be seen that the present invention has the advantage of providing a relatively simple and yet highly efficient means for spacing lumber being stacked. The present invention has the additional advantage of providing a stick layer which can be used either independently of the lumber spacer or in conjunction therewith. This stick layer is capable of handling warped, bent, or otherwise deformed spacer sticks and still operate without jamming or otherwise malfunctioning. The same is highly accurate in its positioning of the sticks on the lumber stack and can be operated by a single person of minimal skill and dexterity.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A lumber stick laying and spacing device comprising: means for moving individual pieces of lumber onto a support means for a row of lumber; spacer means for separating each piece of lumber as it is moved onto said row, said spacer means being in the form of a plurality of spacer blocks movably mounted on an inclined track, means responsive to said lumber moving onto said support means for individually releasing said blocks whereby each block in turn will slide down said track into spacing relationship between said lumber, and an endless cable operatively associated with said spacers for reciprocatingly returning such spacers to said track upon completion of a row of lumber; and means responsive to a completed row of spaced lumber for automatically laying at least one stick means on top of the completed row of spaced lumber whereby a stack of lumber can be formed with spacing between each piece of lumber in each row and spacing between rows can be accomplished.

2. The device of claim 1 wherein the means for moving the individual pieces of lumber is a lumber feed conveyor.

3. The device of claim 1 wherein said spacer means are automatically dropped spacer blocks.

4. The device of claim 1 wherein said means for automatically laying said sticks is disposed above said row of lumber being formed.

5. The device of claim 1 wherein the stick laying means is manually loaded and automatically dropped.

6. A stick laying means for separating rows of lumber as said rows are formed comprising: stick end support means to support at least one spacer stick above the row of lumber being formed; electromechanical means for releasing said stick from said support means when the forming of said row of lumber is complete; guide means in the form of a vehicle type drive chain which will flex in opposed directions only for controlling the fall of said stick from its release to its deposit on the formed row of lumber and means for repositioning said support means for receipt of another stick following said release whereby a plurality of stick separated rows of lumber can be produced to form a stack of lumber.

7. The means of claim 6 wherein said stick laying means is disposed above said row being formed so that said released stick will fall onto said formed row.

* * * * *